(12) United States Patent  
Lindgren

(10) Patent No.: US 7,462,016 B2  
(45) Date of Patent: Dec. 9, 2008

(54) FISH PUMP

(76) Inventor: Peter B. Lindgren, 2499 SE. 8th St., Pompano Beach, FL (US) 33062

( * ) Notice: Subject to any disclaimer, the term of this patent is extended or adjusted under 35 U.S.C. 154(b) by 509 days.

(21) Appl. No.: 10/876,263

(22) Filed: Jun. 24, 2004

(65) Prior Publication Data

US 2005/0284394 A1    Dec. 29, 2005

(51) Int. Cl.
*F04F 5/00* (2006.01)

(52) U.S. Cl. .................................................... 417/197

(58) Field of Classification Search ................. 417/197
See application file for complete search history.

(56) References Cited

U.S. PATENT DOCUMENTS 2,040,890 A * 5/1936 Wrentmore .................. 417/197
5,018,946 A * 5/1991 Breckner et al. ............ 417/197
7,111,975 B2 * 9/2006 Fenton et al. ............ 366/163.2

* cited by examiner

*Primary Examiner*—Devon Kramer
*Assistant Examiner*—Philip Stimpert
(74) *Attorney, Agent, or Firm*—McHale & Slavin, P.A.

(57) ABSTRACT

An improved liquid pump for transporting live fish or other products in an induced flow has secondary line with one end to be placed in a pool of liquid containing fish or other products. The other end of the line is connected to a housing having an internal pump chamber. A primary intake has one end connected to a reservoir of liquid and the other end connected to the housing concentrically about the secondary line. As liquid flows through the primary intake into the pump chamber and out the outlet, the Coanda effect results in a low pressure area in the pump chamber. The liquid in the secondary line is induced to fill the low pressure area. By shaping and directing the primary intake and the secondary intake within the pump chamber a more efficient pump is produced.

24 Claims, 5 Drawing Sheets

FISH PUMP

FIELD OF THE INVENTION

This invention relates to the fishing industry and, more particularly, to fish pumps capable of moving a liquid containing fish or other fragile organisms.

BACKGROUND OF THE INVENTION

In the fishing industry, including the aquaculture industry, and the food industry, as a whole, a primary objective is to move large numbers of products without damage from the source to the marketplace. Fish present a particular problem due to their strength yet fragile structure. The movement of fish, whether from fish nets or retention areas, is most desirable if the fish is not injured during the transfer.

For instance, in commercial fishing the use of a fishing net to pull fish into a boat can result in injury or death to the fish. If the fish are transferred directly from the fishing net into a holding tank on the fishing boat by use of a fish pump, the fish can be transferred without injury thereby delaying the processing time. Current fish pumps have limited size capacity and transporting larger fish can result in severe damage to the fish. Unfortunately even when the current fish pumps are used within a capacity range, the pump designs can lead to excessive stress upon the fish due to wall impact where pressurized water meets the fish laden water.

If the fish is injured, a loss of blood can occur which not only affects the well being of the fish but if the fish is about to be harvested, the blood loss has a direct correlation on the amount of income obtained in a sale of the fish since fisherman are paid by the pound and the loss of blood is a loss of weight.

Transferring the catch from fishing trawlers to the processing docks and harvesting the contents of a growing tank at an aqua-farm require efficient handling of large volumes of water containing live fish or marine organisms. While fishing and aqua-culture are specific examples, there are other industries that move products using liquids as carriers.

In using a Coanda effect pump to transport live fish, the mobility of fish is lessened in reference to the direction of travel because of the flow into the pump. Since the natural tendency of a fish is move against a current so the fish typically enter such a pump swimming into the suction flow thereby entering a secondary intake line tail first. The suction flow in the secondary intake line results from the hydraulic forces of the mixing liquids in the pump chamber creating an induced flow. As the primary flow and induced flow intermix through the pump, the energy becomes uniform in the outlet flow. The problem with such conventional pumps is the sudden turbulence or swirl due to the differential energy in the circumferential primary flow and the inner column of induced flow. Large active fish can be severely injured at this junction wherein scales and fins can be torn off or side wall impact so severe that the fish can killed.

When the fish enters tail first, it can do little to prevent impacting of the walls of the pump as it passes through. Also, when the fish encounters the water swirl formed at the point of water mixing, the forward motion through the pump with deceleration then acceleration results in the likely impact against the wall of the pump.

Such a pump has inherent efficiency due the shear collision effect between the primary liquid injected through the Coanda inlet and the secondary liquid carrying the fish but also from the suction effect created by the action of the primary liquid on the Coanda surface. In such a pump, a first segment upstream of the Coanda surface diverges from its inlet end and terminates at its outlet end immediately before the point of injection of the primary liquid from the Coanda orifice. The inside diameter of the outlet end of the first segment is larger than the inside diameter of the second segment downstream of and smoothly merging with the Coanda surface. A second segment converges downstream from the Coanda orifice and, thereafter, diverges from the minimum inside diameter location.

In the prior art, the first segment diverged abruptly from its inlet end to the outlet end located adjacent the primary liquid injection point through the orifice. The Coanda surface converged to a first inside diameter which was located downstream from the first segment. The inside diameter downstream from the first segment was smaller than the inside diameter of the outlet end of the first segment. For that reason, a fish traveling from the first segment would impact with the converging Coanda surface, thereby causing fish damage or fish kill. Further in the area of the Coanda orifice, there is a low pressure or "suction" zone created by the primary liquid injection which impairs momentum to the secondary liquid flow. However, since the first segment diverged, at the point of primary fluid injection there was a reduced velocity in the first segment due to the increased cross section. This reduced velocity and increased area allowed the secondary fluid to be pulled through the second segment by the Coanda effect around the perimeter of the second segment only and an undesirable no flow or reverse flow condition was allowed to exist in the center or core of the second segment. Under some conditions, the core effect would extend into the inlet end of the first section. When such core effect took place, the no flow or reverse flow core would be able to reverse and re-enter the second segment around the perimeter of the second segment due to the Coanda effect. This would satisfy the low pressure area created by the primary fluid injection over the Coanda surface allowing a loss of secondary fluid flow and unacceptable turbulence in the area of primary injection.

Still another known problem of the prior art Coanda effect pumps was created by the divergence of the second segment from the minimum throat diameter at the Coanda surface to the downstream end of the second segment. This divergence created a larger cross section in the second segment downstream of the Coanda surface and would not permit the effective transfer of the primary fluid momentum throughout the entire cross section of the second segment. This allowed a core of unaffected secondary fluid to exist in the center of the second segment and, under extreme conditions, to extend upstream into the first segment. Such a core resulted in unnecessary turbulence and loss of efficiency.

Yet a further problem with the previous pump related to the liquid injection through the Coanda orifice from the plenum which contained the primary liquid used for injection through the orifice. As the distance from the bottom of the pump increased, the primary liquid would not flow directly radially inwardly after leaving the peripheral injection orifice but, rather, would curve downwardly when viewed from the end. This decreased the Coanda effect and, hence, the efficiency of the pump.

The patent to Breckner et al, U.S. Pat. No. 5,018,946 addressed a number of the prior art pump problems by disclosing an improvement of earlier designs to address the reverse flow in the low pressure area created by the Coanda effect. Another problem addressed by the patent was excessive turbulence in the boundary layer between the primary flow and the secondary column. As a solution to these stated problems, the Breckner et al device adds fins or vanes in the flow path of the primary flow to increase uniformity in the primary flow by the Coanda surface. The angle of the convergence of the primary flow and the secondary flow is increased to reduce the area of transition between the primary flow and the secondary flow. However, the reduction of the transition area increases the turbulence and acceleration. The secondary flow path is designed for transferring fish of about 1-10 pounds and 8 inches in diameter. Although larger sizes are disclosed as possible, the loss of water uniformity occurs at the Coanda surface and fish over 8 inches in diameter as again subjected to injury or death.

Using conventional designs, in order to increase either the size of the product transported or height to be lifted (head) or both, more energy must be added to the primary flow. To increase the size of the reciprocating or centrifugal pump is very expensive and the effects of the greater pressures and velocities of the liquid, in the Coanda effect pump, may cause more trauma to the product. The '946 pump is limited in efficiency to pump diameters of 8 inches or less.

Nagata, U.S. Pat. No. 4,487,553, discloses a jet pump for transporting a liquid utilizing a primary flow and a secondary flow. The primary flow originates from an annular orifice with notches in the periphery.

A further problem, solved by the instant invention, is an ability to feed fish raised in a floating cage. A common method of raising fish on a fish farm is the use of a floating cage placed in a river, lake, ocean or the like open water. A major concern with floating cages is change in the water conditions, in particulary, changes that occur due to high winds or a storm. Should a breach of the cage occur, the entire stock of fish may escape. Currently, the fish raised on a farm can be fed by hand or automatic feeders. One can appreciate that the difficulty in feeding is raised when fish food is placed on the surface of the water with the reliance of gravity to feed the fish. When high winds or a storm occurs, wave action can result in a breach of the structure leading to a loss of fish.

One known prior art method of addressing rough waters is to use underwater fish cages so as to avoid surface waves. However, feeding of the fish becomes difficult since feeding must now address the body of water above the cage which may include a current. A known device to overcome food drift is the use of gravity tubes which are very slow and require a boat or barge to be positioned directly over the cage.

Another way of feeding fish held in an underwater cage is by use of a pump. However, typical food for farm fish is in a pellet form which is damaged by most pumps. Damaging of the fish pellets results in smaller size matter which may not be detected by the fish before floating away.

What is needed in the art is an efficient liquid pump that can safely transport larger fish over a greater head yet minimize turbulence and swirl to reduce fish stress and damage. What is further needed in the art is an efficient liquid transfer pump capable of transferring fish food beneath the surface of a body of water.

SUMMARY OF THE PRESENT INVENTION

The present invention is directed toward an improved Coanda effect pump for transporting liquid and associated product by induced flow. The pump has a housing with a primary intake for primary flow, a secondary intake for induced flow, an internal pump chamber for intermixing said primary flow and said secondary flow, and an outlet for discharge. The primary intake and said secondary intake are constructed and arranged so as to terminate in a orifice within the housing. The orifice allows the primary flow to be circumferential with the induced flow with both primary flow and induced flow exiting said orifice into a pump chamber. The orifice includes a circumferential gap between the primary intake and the housing directing the primary flow into the pump chamber at an acute angle to the axis of the induced flow. The secondary intake has an internal surface and an external surface with the orifice having flutes formed in the external surface of the secondary intake. An enlarged mouth extends a distance within the internal surface of said secondary intake. The mouth has a constant diameter for forming the secondary flow whereby the primary flow and the secondary flow intermix in the pump chamber with minimal swirl to inhibit damage to the product passing through the pump.

Therefore, it is an objective of this invention to provide a Coanda effect pump which creates a high speed boundary layer with a means for then breaking up the boundary layer to increase the efficiency of intermixing of the primary flow and the induced flow.

Still another objective of the invention is to teach the use of orifice serration and a discharge nozzle, wherein Coanda pumps with small gaps can be configured to have higher efficiencies than large gaps, allowing very high induced flows from a primary pump at low flows.

It is another objective of this invention to provide a transition zone in the pump chamber and a discharge velocity that does not injure live fish providing a pump system that is more efficient with smaller gaps.

It is yet another objective of this invention to teach the reduction of the angle of convergence between the primary flow and the induced flow thereby reducing the turbulence and swirl in the flow.

A further objective of this invention is to teach disrupting the boundary layer between the primary flow and induced flow to more quickly intermix with the induced flow.

A further objective of this invention is to teach a fish friendly Coanda effect pump having an 8 inch or larger diameter. The pump made efficient by reducing or eliminating the back flow and swirl created in high lifts.

Another objective of the invention is to provide a highly efficient pump that can move large diameter fish including salmon as well as high volume of smaller items such as herring and mussels.

Another use for the invention is to provide a highly efficient pump capable of transferring fish food with minimal or no breakage of the food to an underwater cage.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
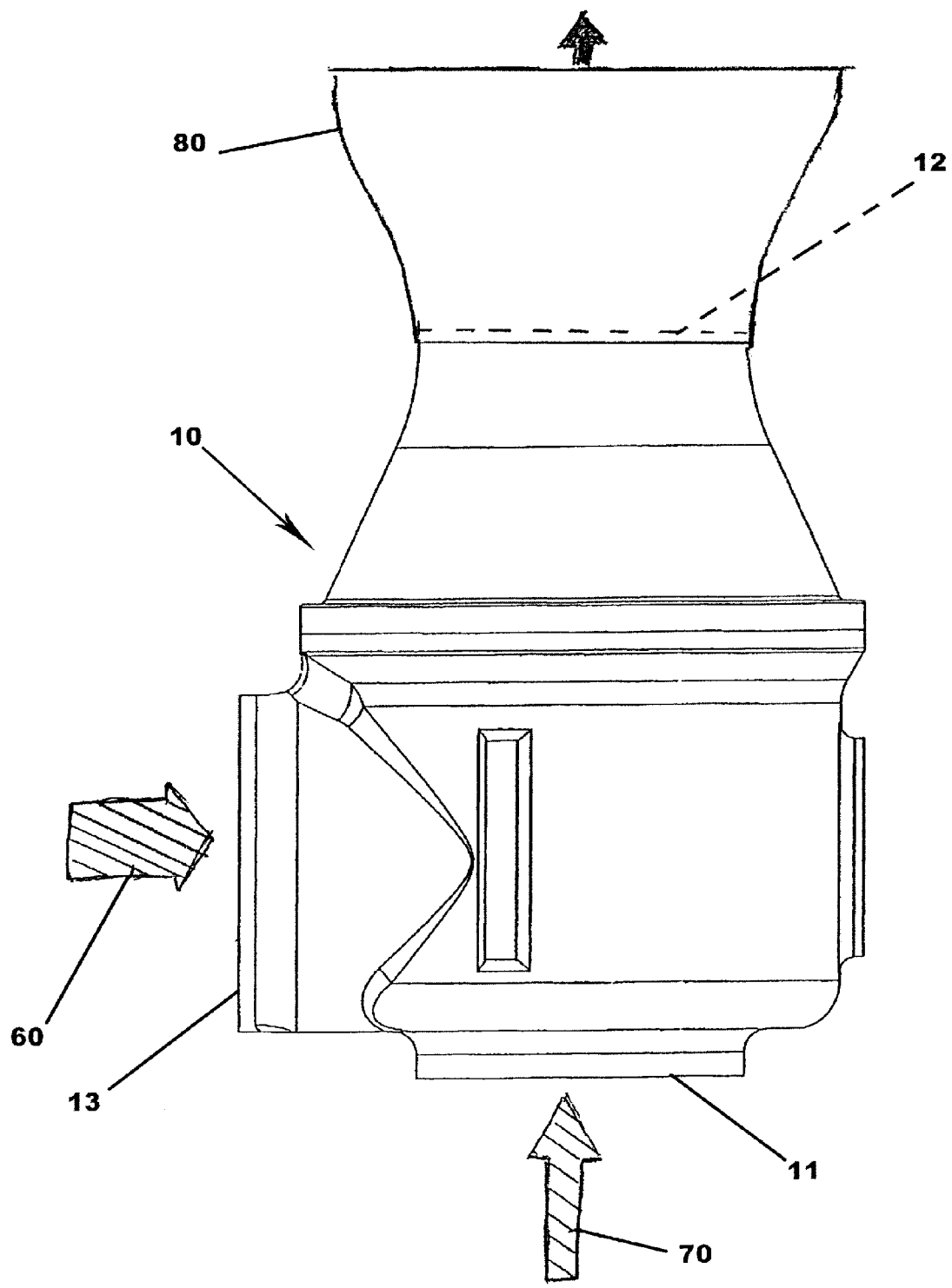
FIG. 1 is a side view of the pump of this invention with a discharge nozzle.

The Coanda effect pump 10, illustrated in FIG. 1, is constructed with two intakes, a primary intake for the primary liquid flow and a secondary intake for the induced liquid flow, a pump chamber, and one outlet for the discharge or work product. The primary liquid flow 60 is created by a source of power, such as a centrifugal pump (not shown) moving a large volume of liquid, connected to the primary intake. The source liquid for the primary flow 60 may be held in a reservoir (not shown) fed by a separate source of clean liquid, part of a closed system in which the discharge is filtered or otherwise cleaned and returned to the reservoir, or from a source of unlimited make-up water such as an ocean, lake, or river. The source liquid is of suitable consistency to pass through the power pump without interruption and develop a steady flow. The preferred liquid is water.

The induced liquid flow 70 is a reaction flow created by the low pressure area existing in the pump chamber and is drawn into the pump through the secondary intake 11. The secondary intake for the induced flow is connected to a line (not shown) that can be introduced into a body of liquid containing the fish or product to be transported. This line may be flexible for maneuverability. The primary liquid, the secondary liquid and the articles are discharged through the outlet 12 of the pump chamber. The outlet 12 is connected to the nozzle 80 which is formed in a bell shape with the mouth approximately twice the diameter of the outlet 12. The nozzle 80 may be connected to a line for directing the discharge to perforated collecting bins (not shown) which separate the product from the carrier liquid. The nozzle 80 may be removably connected to outlet 12 or formed integrally therewith. The velocity of the discharge flow must be slow enough to prevent trauma to the product during the collection. This velocity is directly related to the power of the primary flow and the degree of intermixing with the induced flow.

Figure 2:
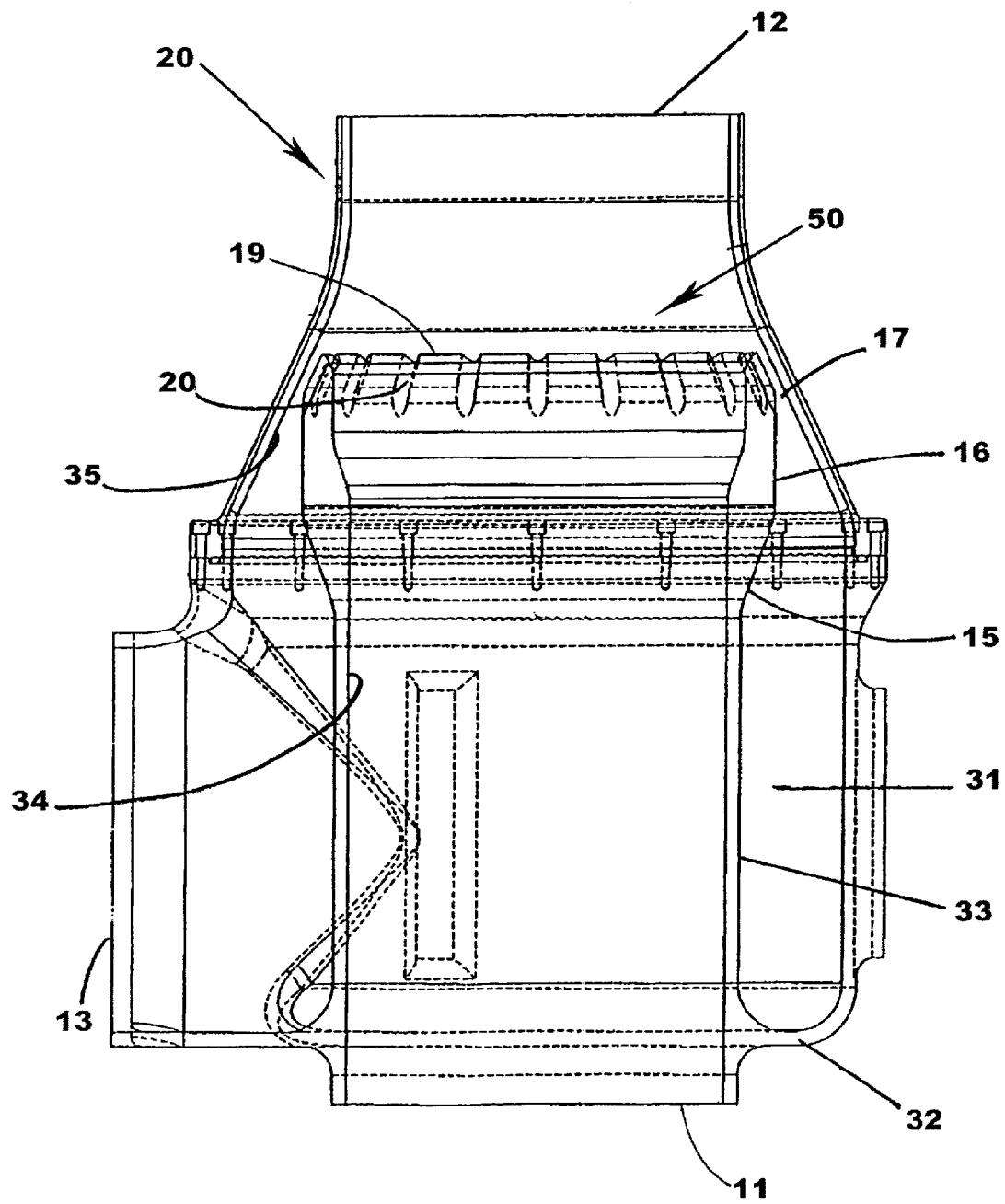
FIG. 2 is an internal side view, partially in phantom lines, of the pump of FIG. 1.
Figure 3:
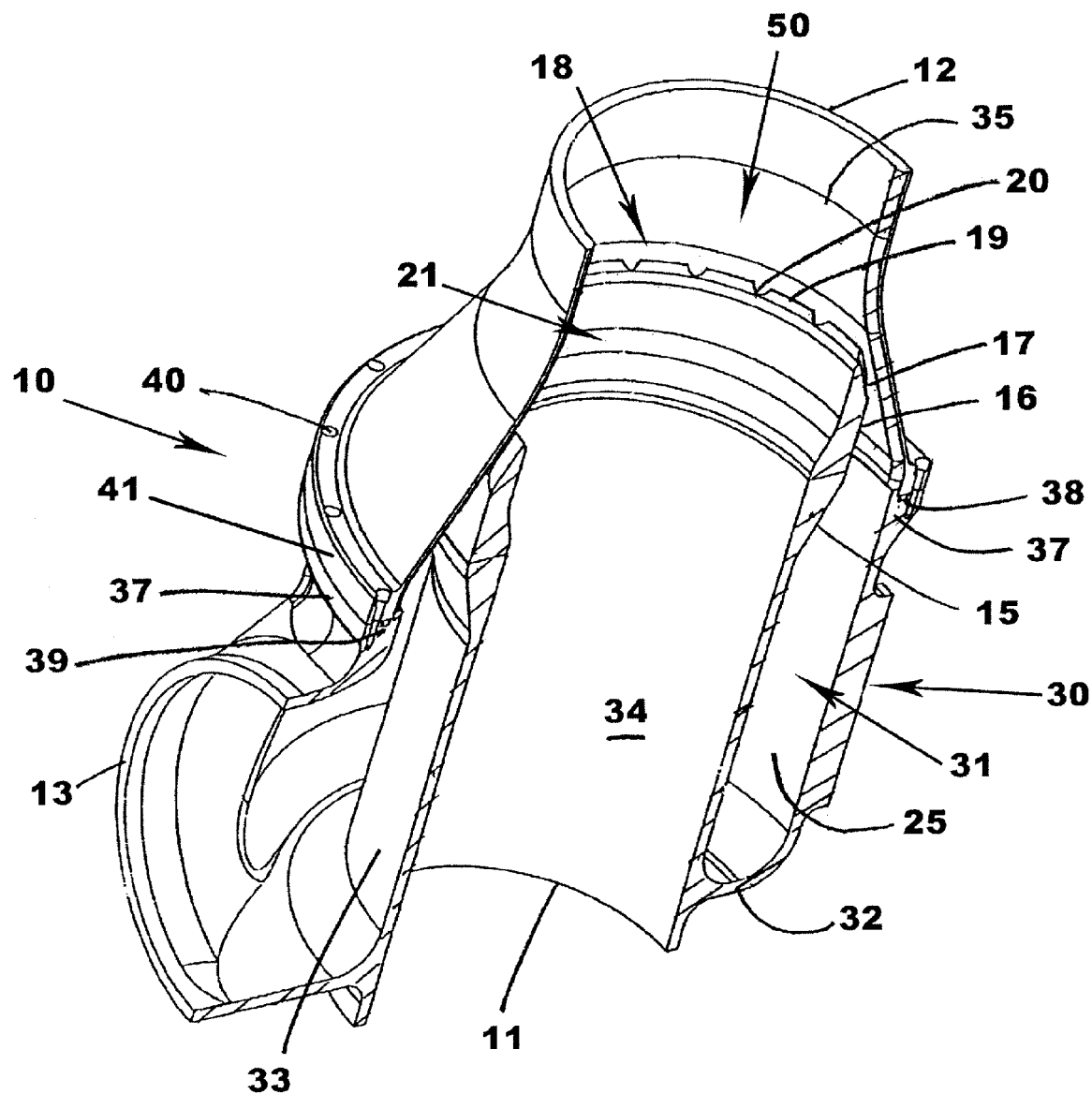
FIG. 3 is a perspective, partially in section, of the pump of FIG. 1.

Now with reference to FIGS. 2 and 3, the primary intake 13 is part of the outer casing 30 of the pump. The primary liquid flow 60 from the power pump enters the intake 13 and fills the plenum 31. Secondary intake 11 is connected to the outer casing 30 and extends through the plenum 31. The outlet 12 is illustrated as being attached to the outer casing 30 by bolts 40 extending through a flange 41 screwed into the outer casing 30, though alternative fastener means may be used. The outer casing 30 terminates in a flange 37 which includes a seal ring 38 in a seal groove 39. As illustrated, the primary intake, secondary intake, and plenum of the Coanda effect pump are a one piece design however, the elements may be separately made and joined together by welds, bolts, adhesives or autologous bonding. The outer casing and the outlet form the housing of the pump.

The plenum 31 is the space between the inner wall 25 of the outer casing and the outer wall 33 of the intake 11. The closed bottom 32 of the plenum is formed by the outer casing 30 and the secondary intake. The plenum acts as a pressure and flow regulator for the primary flow 60 to insure a uniform flow of primary fluid through the orifice 17 into the pump chamber 50. The orifice 17 forms the opening connecting the plenum and the pump chamber 50. The side walls of the orifice determine the angle of the primary flow 60 into the pump chamber 50. The side walls of the orifice are shaped by the inner wall 35 of the outlet 12 and the outer end 19 of the secondary intake 11. However, the primary flow 60 is also affected by the shoulder 15 on the secondary intake 11 within the plenum 31.

The inner wall 34 of the secondary intake 11 has an area of increased diameter adjacent the opening 18. The enlarged mouth 21 of the intake 11 reduces pressure immediately before the induced flow is ejected into the pump chamber. This change may also reduce the integrity of the boundary layer of the induced flow. The serrations or flutes 20 on the outer end 19 of the secondary intake 11 disrupt the cross section of the primary flow into the pump chamber 50. The crennelated cross section is thought to reduce the symmetry of the boundary layer and provide more surface area for mixing of the primary flow with the induced flow. In a preferred embodiment, the flutes are approximately 0.25 in. deep and 0.25 in. in radius and uniformly spaced about the circumference of the intake. The flutes may range from as little as 18 degrees apart to the preferred embodiment of about 36 degrees apart.

Figure 4:
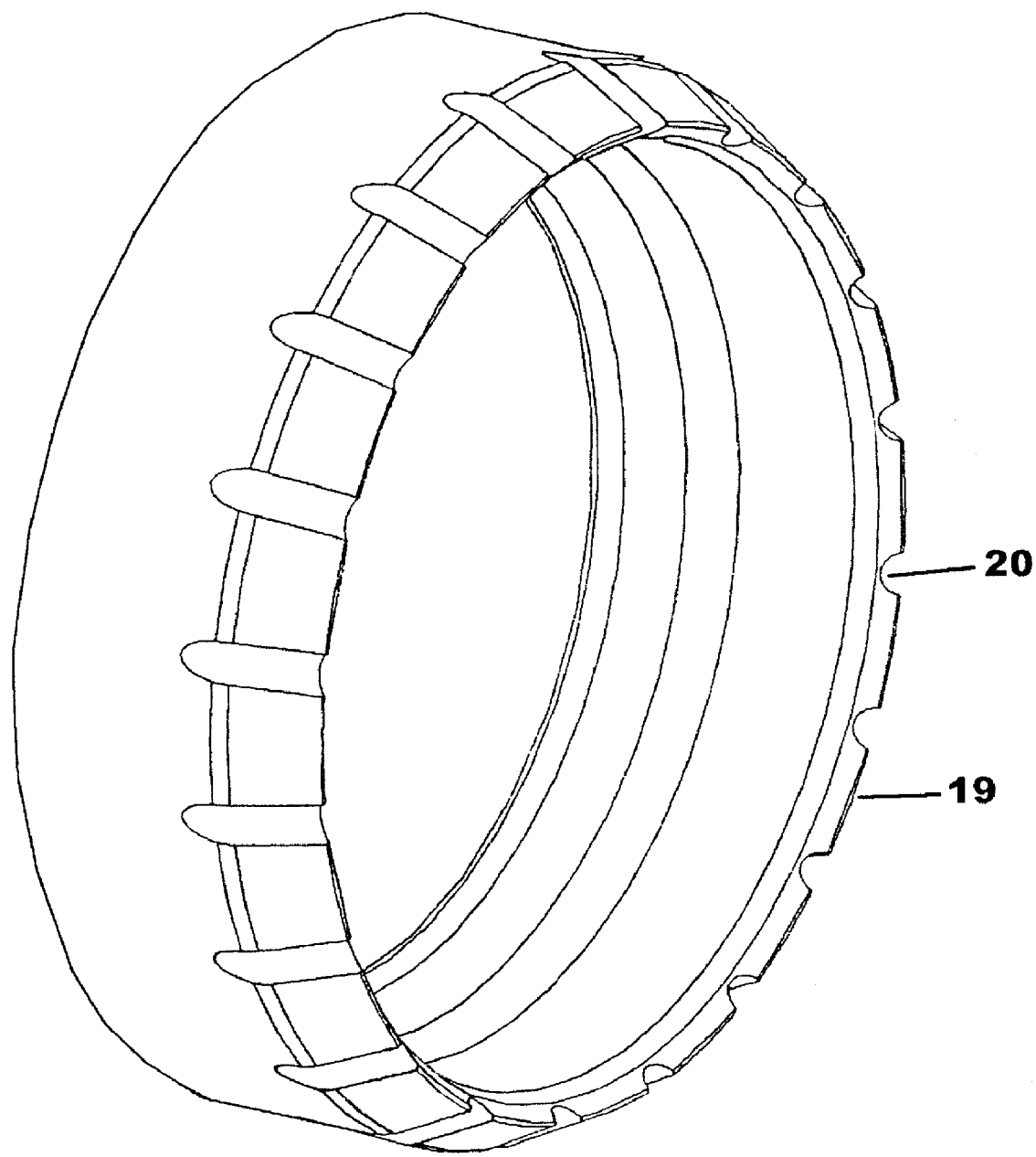
FIG. 4 is a perspective view of the orifice.

A diverging and then parallel or converging diameter prior to the primary water junction operates to introduce the secondary or suction water as close to parallel flow to primary water as possible. The ratio of the inlet diameter to the diameter of the primary water orifice junction is 1 to 1.2 or less. FIG. 4 further depict the serrations or flutes 20 on the outer end 19 of the secondary intake which disrupt the cross section of the primary flow into the pump chamber. The flutes are formed 20 along the outer surface 17 of the mouth of the secondary intake wherein the flutes are formed as depressions along the outer surface 17 which do not extend to an inner surface of the intake. The crennelated cross section reduces the symmetry of the boundary layer and provides more surface area for mixing of the primary flow with the induced flow. As previously stated, in a preferred embodiment, the depressions which form the flutes are approximately 0.25 in. deep and 0.25 in. in radius and uniformly spaced about 36 degrees about the circumference of the intake.

The diverging exit nozzle 80 shown in FIG. 1 provides a discharge feature wherein the internal volume is increased thereby reducing pressure.

The following table illustrates the properties of the pump of this invention, based on an 8 inch I.D. Coanda effect pump:

| Gap angle deg. | Gap in. | Pressure PSI | Flow ratio | | | |
|---|---|---|---|---|---|---|
| | | | A* | B* | C* | D* |
| 43 | 0.4 | 12 | .362 | 0.4 | | |
| 43 | 0.3 | 22 | .508 | .532 | .528 | .543 |
| 43 | 0.2 | 18 | .560 | .60 | .570 | .596 |
| 35 | 0.4 | 18 | .440 | .470 | | |
| 35 | 0.3 | 24 | .528 | .552 | | |
| 35 | 0.2 | 26 | .592 | .622 | .623 | .640 |
| 25 | 0.4 | 20 | .457 | .471 | | |
| 25 | 0.3 | 24 | .582 | .60 | | |
| 25 | 0.2 | 26 | .651 | .674 | .707 | .739 |

The flow ratio is the amount of induced flow per primary flow expressed as a percentage.
A = Coanda effect pump of the prior art;
B = Coanda effect pump of the prior art using a discharge orifice of the instant invention.
C = Coanda effect pump of the instant invention having a serration feature;
D = Coanda effect pump of the instant invention having a the discharge orifice, serration feature, and using a discharge nozzle.

EXAMPLE 1

A pump of the prior art having a gap injection angle of 43 degrees and 0.4 inches has a flow ratio of 0.362. The addition of a discharge nozzle increase the flow ratio to 0.4.

If the gap injection angle of 43 degrees is maintained but the gap reduced to 0.3 inches, the efficiency allows a flow ratio of 0.508. The addition of the discharge orifice of this invention increases the flow ratio to 0.532. If the flutes are present on the orifice, but no discharge nozzle, the efficiency is raised from 0.508 to 0.528. If the discharge nozzle is included with the orifice flutes, then the efficiency is raised from 0.508 to 0.543.

If the gap injection angle of 43 degrees is maintained but the gap angle reduced to 0.2 inches, the efficiency allows a flow ratio of 0.560. The addition of a discharge orifice increases the flow ratio to 0.600. If the flutes are present on the orifice, but no discharge nozzle, the flow ratio is raised from 0.560 to 0.570. If the discharge nozzle is included with the orifice flutes, then the flow ratio is raised from 0.560 to 0.596.

EXAMPLE 2

A pump of the prior art having a gap injection angle of 35 degrees and 0.4 inches has a flow ratio of 0.440. The addition of a discharge orifice increases the flow ratio to 0.470.

If the gap injection angle of 35 degrees is maintained but the gap angle reduced to 0.2 inches, the efficiency allows a flow ratio of 0.592. The addition of a discharge orifice increases the flow ratio to 0.622. If the flutes are present on the orifice, but no discharge nozzle, the flow ratio is raised from 0.592 to 0.623. If the discharge nozzle is included with the orifice flutes, then the flow ratio is raised from 0.592 to 0.640.

EXAMPLE 3

A pump of the prior art having a gap injection angle of 25 degrees and 0.4 inches has a flow ratio of 0.457. The addition of a discharge orifice increases the flow ratio to 0.471.

If the gap injection angle of 25 degrees is maintained but the gap angle reduced to 0.2 inches, the efficiency allows a flow ratio of 0.651. The addition of a discharge nozzle increases the flow ratio to 0.674. If the flutes are present on the orifice, but no discharge nozzle, the flow ratio is raised from 0.651 to 0.707. If the discharge nozzle is included with the orifice flutes, then the flow ratio is raised from 0.651 to 0.739.

The test performed evidences that the prior art pump having a 43 degree angle and 0.4 inch gap can have the flow ratio increased from 0.362 to 0.739 by use of a 25 degree angle with a 0.2 inch gap wherein the orifice is fluted and a discharge nozzle is added to the pump. Coanda pumps with small gaps can be configured to have higher efficiencies than with large gaps. Thus, the pump system can be most efficient with smaller gaps and angle which further allows increased product protection of the items transferred.

The inner and outer walls of the shaped gap, the flutes and the mouth combine to form the orifice 18. The angle and cross section of the primary flow relative to the axis and surface tension of the induced flow determine the characteristics of the combined flow in the transition zone of the pump chamber. These features shape the low pressure area, provide for gradual acceleration and reduce the intermixing swirl thereby increasing efficiency of the pump. The exit diameter of the diverging exit orifice is no more than twice the pump bore diameter. The injection angle can be expressed in degrees that is less than 3.5 times the pump diameter expressed in inches.

The internal diameter of the secondary intake 11 is such that articles, such as live fish weighting up to 20 pounds, may be raised to a head over 15 feet without damage. Similarly, the efficiency of the instant pump allows high volume transfer of smaller items such as mussel without damage. High volume transfer is critical to those in a transfer position where time is of the essence. For instance, the transfer of fish from a fishing boat to a hauling boat are commonly performed while at sea which allows the fishing boat to empty its storage area to permit an extended fishing expedition. The time spent in transferring of the fish results in a lost profit since the fishing boat crew is idled during the transfer. Further to this example, the fishing opportunities must be realized when the fish are available, thus, assuring the quick return of the fishing boat to its designated function is a requirement to realize profits.

Figure 5:
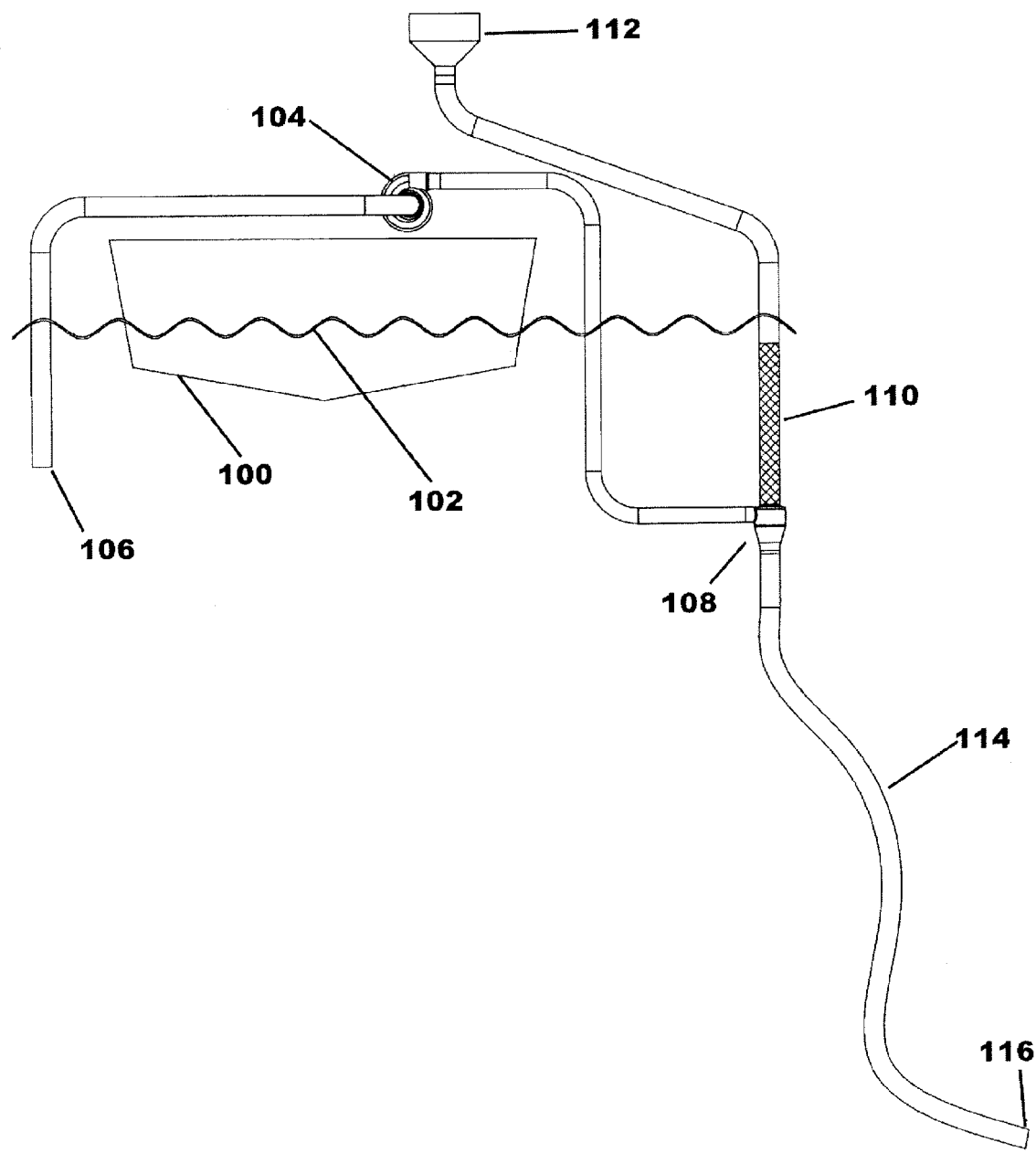
FIG. 5 depicts a pictorial view of an alternative se embodiment wherein the pump of this invention is used feed underwater fish farms.

The pump of the instant invention can be further used to move fish feed pellets to an underwater fish cage without causing breakage of the feed pellets. Referring now to FIG. 5, the coanda effect pump system for transferring of the fish pellets is illustrated. A vessel 100 is shown floating on a body of water 102. The vessel is used to carry fish food over a fish cage wherein a centrifugal pump 104 or the like is used for pulling of a primary water supply from the body of water through intake 106. The primary water supply is transferred to the coanda effect pump 108. A secondary inlet to the pump 108 includes a finely perforated pipe 110 that will allow water to fill the pump but not allow for loss of feed pellets. A funnel shaped receiver 110 can be used for insertion of feed pellets into the pipe 110 wherein suction will draw the pellets into the secondary suction of the pump 108. It should be noted that the fish food can be inserted into the pipe 110 by the use of a shovel, or automatically transferred into the pipe 110 by use of an auger or other metering device. The output of the feeder is coupled to a flexible feed tube 114 and the distal end 116 of the tube 114 available for positioning near the fish in need of food. The tube 114 may include a header and valve arrangement, not shown, to direct delivery of the food to multiple or alternate cages. In this embodiment, the coanda effect pump 108 is placed beneath the water which, together with the feeder pipe 110, removes entrapped air from the fish pellets.

One skilled in the art will readily appreciate that the present invention is well adapted to carry out the objects and obtain the ends and advantages mentioned, as well as those inherent therein. Any techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A pump for transporting liquid by induced flow, said pump comprising a housing having a primary intake for primary flow said primary intake having an inlet diameter, a secondary intake for induced flow, said secondary intake forming a pump bore diameter formed by an internal surface and an external surface, an internal pump chamber for intermixing said primary flow and said induced flow, and an outlet for discharge, said primary intake and said secondary intake terminating in said internal pump chamber, an orifice forming a primary flow path for said primary flow circumferentially with respect to an induced flow path of said induced flow, said primary flow and said induced flow intermixing in said internal pump chamber, said orifice having an orifice diameter having a circumferential gap between said primary intake and said housing directing said primary flow into said pump chamber at an acute angle to an axis defined by said induced flow, said orifice including flutes defined by spaced apart surface depressions formed in said external surface of said secondary intake, wherein said depressions do not extend through said secondary intake to the internal surface thereof, an enlarged mouth extending a distance within said internal surface of said secondary intake, said mouth having a constant diameter forming said secondary flow with a constant diameter whereby reduced swirl formation is achieved subsequent to intermixing of said primary flow and said secondary flow.

2. The pump according to claim 1 wherein said housing includes a plenum between said housing and said secondary intake, said primary intake connected to said plenum near one end, said orifice forming an opening in the other end of said plenum.

3. A pump for lifting a liquid containing marine organisms comprising a casing connected to an outlet, said casing including a secondary intake having an internal diameter at one end extending into said casing, said one end of said secondary intake terminating in a mouth, a primary intake having a first outer diameter, said mouth having a second larger outer diameter, said second larger outer diameter tapering to said internal diameter, said outlet having a conical internal surface, said conical internal surface of said outlet parallel with said second larger outer diameter, including flutes defined by spaced apart surface depressions which do not extend to an inner surface of the secondary intake formed in said second larger outer diameter of said mouth, whereby liquid flow through said primary intake forms a low pressure area at said mouth and induces flow through said secondary intake.

4. The pump for lifting a liquid containing marine organisms according to claim 3 wherein said second larger outer diameter tapers to said internal diameter at an angle of about 20 degrees to about 50 degrees relative to the longitudinal axis of the secondary intake.

5. The pump for lifting a liquid containing marine organisms according to claim 3 wherein said second larger outer diameter is spaced from said outlet approximately 0.2 inches.

6. The pump for lifting a liquid containing marine organisms according to claim 3, said flutes formed as depressions are spaced approximately every 36 degrees about the circumference of said mouth.

7. The pump for lifting marine organisms according to claim 3 wherein marine organisms are defined as live fish of approximately 20 pounds and said pump capable of drawing a head of approximately 15 feet suitable for lifting the marine organisms without injury.

8. The pump for lifting marine organisms according to claim 3 wherein a flow ratio in the amount of induced flow per primary flow is between approximately 0.300 to 0.750.

9. The pump for lifting marine organisms according to claim 3 wherein a ratio of the inlet diameter to the orifice diameter is less than 1.2.

10. The pump for lifting marine organisms according to claim 3 including an exit nozzle having an exit diameter of 1.2-2 times the pump bore diameter.

11. The pump for lifting marine organisms according to claim 4 wherein said angle of internal diameter to said second larger outer diameter expressed in degrees is less than 3.5 times the pump bore diameter expressed in inches.

12. A pump for lifting a liquid containing marine organisms comprising a casing having a primary intake connected to a pressurized outlet to obtain primary flow, said casing including a secondary intake for induced flow having an internal diameter and one end extending into said casing, said secondary intake including an elongated mouth, said secondary intake having a first outer diameter, said mouth having a second larger outer diameter having flutes defined by spaced apart surface depressions formed in said second larger outer diameter, wherein said flutes formed as depressions do not extend to an internal surface of said mouth, said second larger outer diameter tapering to said internal diameter, an orifice having a conical internal surface, said conical internal surface of said orifice parallel with a tapering outer diameter of said secondary intake providing a flow ratio between 0.300 to 0.750 percent of the induced flow per the primary flow, whereby liquid flow through said primary intake forms a low pressure area at said orifice and induces flow through said secondary intake wherein secondary water is introduced approximately parallel to the primary water flow wherein the admixed flow is discharged from the casing together with the marine organisms.

13. The pump for lifting marine organisms according to claim 12 wherein said second larger outer diameter tapers to said internal diameter at an angle expressed in degrees that is less than 3.5 times the pump diameter expressed in inches.

14. The pump for lifting a liquid containing marine organisms according to claim 13 wherein said second larger outer diameter tapers to said internal diameter at an angle of about 20 degrees to about 50 degrees relative to the longitudinal axis of the secondary intake.

15. The pump for lifting a liquid containing marine organisms according to claim 12 wherein said orifice is circumferential and approximately 0.1 inch to about 0.5 inch in width.

16. The pump for lifting a liquid containing marine organisms according to claim 12 wherein said flutes are further defined as depressions spaced approximately every 36 degrees about the circumference of said mouth.

17. The pump for lifting marine organisms according to claim 12 wherein marine organisms are defined as live fish of approximately 20 pounds and said pump capable of drawing a head of approximately 15 feet suitable for lifting the marine organisms without injury.

18. The pump for lifting marine organisms according to claim 12 wherein a ratio of the inlet diameter to the orifice diameter is less than 1.2.

19. The pump for lifting marine organisms according to claim 12 wherein the discharge of the casing is defined by an exit orifice having a diameter no more than twice the pump bore diameter.

20. A pump for lifting a liquid containing marine organisms comprising a casing connected to an outlet, said casing including a secondary intake having an internal diameter and one end extending into said casing, said one end of said secondary intake terminating in a constant internal diameter mouth, an orifice surrounding said mouth, said mouth having a first outer diameter, said orifice having a second larger outer diameter with flutes formed in said outer diameter of said mouth, said flutes formed as depressions spaced approximately every 36 degrees about the circumference of said mouth, wherein said flutes formed as depressions do not extend to an internal surface of said mouth, said second larger outer diameter tapering to said internal diameter, said outlet having a conical internal surface, said conical internal surface of said outlet parallel with said tapering outer diameter of said secondary intake wherein the ratio of the inlet diameter to the diameter of constant internal diameter mouth is 1 to 1.2 or less, whereby liquid flow through said primary intake forms a low pressure area at said orifice and induces flow through said secondary intake wherein the admixed flow is discharged from the casing together with the marine organisms.

21. The pump for lifting a liquid containing marine organisms according to claim 20 wherein said second larger outer diameter tapers to said internal diameter at an angle of about 20 degrees to about 50 degrees relative to the longitudinal axis of the secondary intake, the discharge of the casing is defined by an exit orifice having a diameter no more than twice the pump bore diameter.

22. The pump for lifting a liquid containing marine organisms according to claim 20 wherein said mouth's outer diameter is spaced between 0.1 inches to about 0.4 inches from said outlet.

23. The pump for lifting marine organisms according to claim 20 wherein said marine organisms are live fish of approximately 20 pounds and said lifting includes a head of approximately 8 feet.

24. The pump for lifting marine organisms according to claim 20 wherein a flow ratio in the amount of induced flow per primary flow is between approximately 0.300 to 0.750.

\* \* \* \* \*